Feb. 22, 1966   S. E. MANECKE   3,236,548
MOUNTING MEANS AND METHOD FOR CONTROL DEVICES AND THE LIKE
Filed March 26, 1962                          2 Sheets-Sheet 1

INVENTOR
SIEGFRIED EMIL MANECKE

BY  Robert R. Candor
HIS ATTORNEY

Feb. 22, 1966   S. E. MANECKE   3,236,548
MOUNTING MEANS AND METHOD FOR CONTROL DEVICES AND THE LIKE
Filed March 26, 1962   2 Sheets-Sheet 2

INVENTOR
SIEGFRIED EMIL MANECKE

BY *Robert R. Candor*

HIS ATTORNEY

United States Patent Office 3,236,548
Patented Feb. 22, 1966

3,236,548
MOUNTING MEANS AND METHOD FOR CONTROL DEVICES AND THE LIKE
Siegfried Emil Manecke, Indiana, Pa., assignor to Robertshaw Controls Company, a corporation of Delaware
Filed Mar. 26, 1962, Ser. No. 182,394
5 Claims. (Cl. 287—20)

This invention relates to an improved means and method for mounting a control device or the like to a supporting structure, such as an instrument panel or the like.

Heretofore, such control devices normally comprised an open-ended casing or housing receiving the control mechanism through the opened end thereof and subsequently being closed by a detachable mounting plate or cover member, the cover member having an aperture passing therethrough and telescopically receiving a threaded bushing or insert having an enlarged head disposed between the cover member and the control housing.

The control shaft of the control mechanism passes outwardly through the bushing or insert and is adapted to receive a suitable control knob or the like after the control device has been mounted to a supporting structure by having the bushing and shaft pass through an aperture in the supporting structure and telescopically receiving a nut, commonly called a Palnut, on the free end of the bushing to draw the control device against one side of the supporting structure.

In order to prevent rotation of the threaded bushing during the threading of the nut thereon, the enlarged end of the bushing was either previously spot welded or staked to the inside surface of the cover member.

However, not only is such prior known structure relatively expensive because the same requires expensive welding equipment and the like, but also the bushing and cover member had to be made of relatively expensive weldable metal stock and the cover member had to be plated to provide an attractive and non-corrosive structure.

However, by following the teachings of this invention, no expensive or complicated welding or staking operations are required to prevent rotation of the threaded bushing whereby the bushing can be made from relatively cheap material, such as a brass rod or the like.

Further, since this invention does not require an expensive and time-consuming welding operation, the cover member for the control can be formed of aluminized steel whereby subsequent plating to provide an attractive and non-corrosive cover is eliminated.

Further, since the threaded bushing of this invention is not permanently attached to the cover member of the control device, the threaded bushing can be readily replaced when damaged without requiring a new cover member in combination therewith.

Accordingly, it is an object of this invention to provide an improved mounting means for a control device or the like and having one or more of the novel features of this invention set forth above or hereinafter shown or described.

Another object of this invention is to provide an improved method for attaching a control device or the like to a supporting structure or the like.

Other objects, uses, and advantages of this invention are apparent from a reading of this description which proceeds with reference to the accompanying drawings forming a part thereof and wherein:

FIGURE 1 is a partial, cross-sectional side view of the control device of this invention mounted to a supporting structure or the like.

Figure 1:
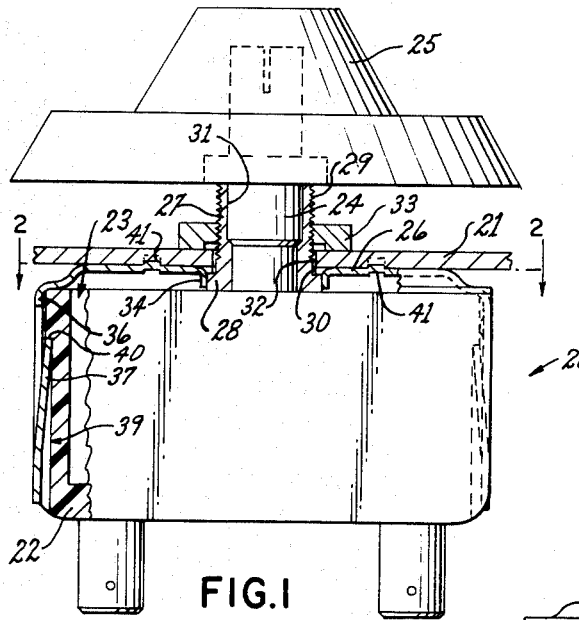
Figure 4:
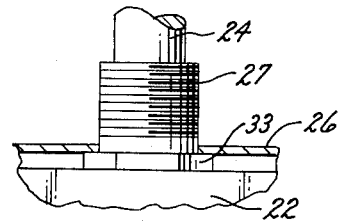
FIGURE 4 is a fragmentary, cross-sectional view taken on line 4—4 of FIGURE 2.

While the various features of this invention are hereinafter illustrated and described as being particularly adaptable for mounting a control device to an instrument panel or the like, it is to be understood that the various features of this invention can be utilized singly or in any combination thereof to provide other constructions as desired.

Therefore, this invention is not to be limited to only the embodiment illustrated in the drawings, because the drawings are merely utilized to illustrate one of the wide variety of uses of this invention.

Referring now to FIGURE 1, an improved control device 20 of this invention is mounted to a supporting structure 21, such as an instrument panel or the like, according to the teachings of this invention.

The particular details of the control mechanism of the control device 20 do not form a part of this invention. However, the embodiment of the control device 20 as illustrated in the drawings has an open-ended housing 22 adapted to receive suitable control mechanism through the opened end 23 thereof, the control mechanism to be operated by a control shaft 24 having a suitable control knob 25 detachably secured to the free end thereof.

A suitable cover member or mounting plate 26 is adapted to be detachably secured to the housing 22 in a manner hereinafter described and close the open end 23 thereof in the manner illustrated in FIGURE 1.

An improved threaded bushing or insert 27 of this invention has an enlarged end 28 adapted to be disposed between the cover member 26 and the housing 22 and has an externally threaded shank portion 29 passing through an aperture 30 in the cover member 26, the threaded bushing or insert 27 having a stepped bore 31 passing therethrough for reception of the control shaft 24 in the manner illustrated in FIGURE 1.

The threaded bushing 27, after the same has been assembled to the control device 20 in a manner hereinafter described, is adapted to pass through a suitable opening 32 formed in the supporting structure 21 and have a Palnut 33 threaded thereon to attach the control device 20 to one side of the supporting structure 21 while the control knob 25 can be located on the other side of the supporting structure.

As previously set forth, the enlarged portion 28 of the threaded bushing 27 was normally welded to undersurface of the cover member 26 to prevent rotation of the bushing 27 relative to the control device 20 when the nut 33 was threaded thereon to mount the control device 20 to the supporting structure 21.

However, such prior known welding means was an expensive operation and required that the cover member 26 and insert 27 be formed of readily weldable material whereby the overall cost of the prior known mounting means is relatively high.

However, according to the teachings of this invention, the insert 27 and cover member 26 are so constructed and arranged that the insert 27 is not adapted to be rotated relative to the cover member 26 when the nut 33 is threaded thereon although the insert 27 is not secured to the cover member 26.

In this manner, the insert 27 can be made from relatively cheap metal stock, such as from brass rods or the like, and the cover member 26 can be formed from aluminized steel or the like so that plating thereof is not required to provide an attractive and non-corrosive structure.

The more specific details of this invention will now be described.

Figure 2:
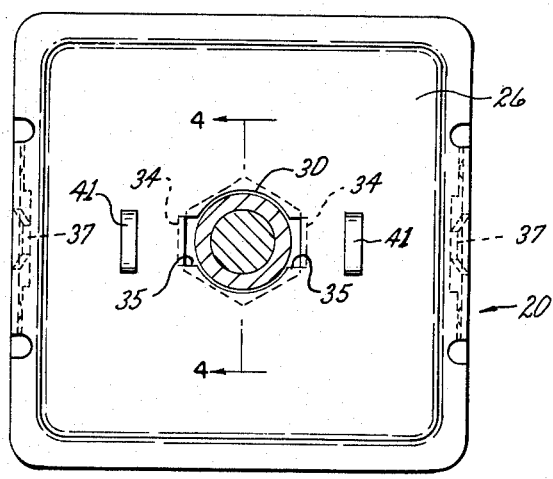
FIGURE 2 is a cross-sectional view taken on line 2—2 of FIGURE 1.
Figure 5:
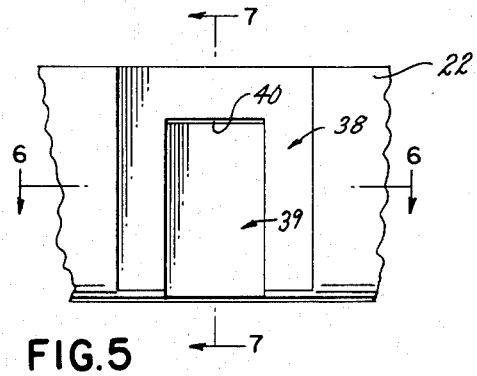
FIGURE 5 is a fragmentary side view of one portion of the housing of the control device of this invention.
Figure 7:
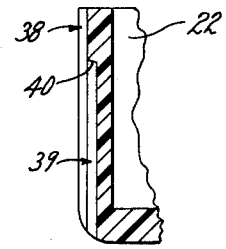
FIGURE 7 is a fragmentary, cross-sectional view taken on line 7—7 of FIGURE 5.
Figure 6:
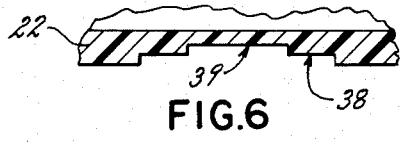
FIGURE 6 is a fragmentary, cross-sectional view taken on line 6—6 of FIGURE 5.
Figure 8:
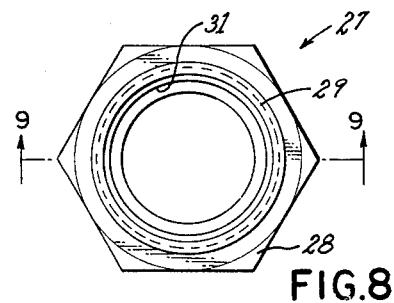
FIGURE 8 is a top view of the improved bushing of this invention illustrated in FIGURE 9.
Figure 10:
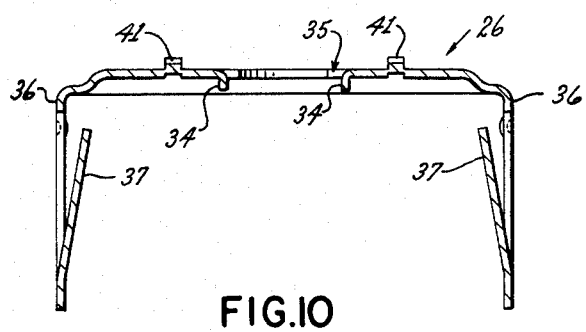
FIGURE 10 is an axial, cross-sectional view of the improved cover member of this invention.
Figure 9:
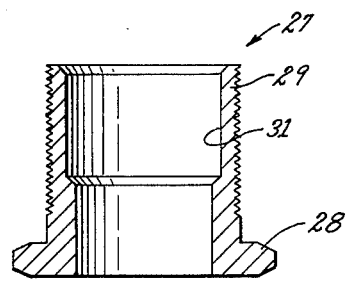
FIGURE 9 is a cross-sectional view of the bushing illustrated in FIGURE 8 and is taken on line 9—9 thereof.

Reference is made to FIGURES 2 and 10 wherein the cover member 26 has a pair of diametrically opposed tab means 34 bent inwardly and disposed outboard of the periphery of the circular aperture 30 passing therethrough, the bent tab portions 34 defining radially outwardly directed slots 35 in the cover member 26.

The tab means 34 of the cover member 26 are disposed apart a distance substantially equal to the distance between opposed side portions on the enlargement 28 of the threaded insert or bushing 27 whereby the bushing 27 is adapted to have the shank portion 29 thereof pushed through the aperture 30 and have the enlargement 28 thereof nested between the tab means 34 so that the tab means 34 prevent rotational movement of the insert 27 relative to the cover member 26 although the insert 27 is loosely mounted relative to the cover member 26.

For example, the enlargement 28 of the bushing or insert 27 can have a hexagonal configuration as illustrated in the drawings.

Figure 3:
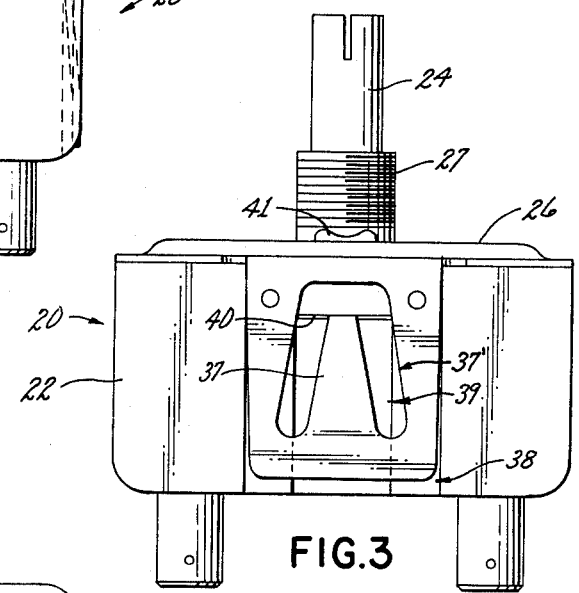
FIGURE 3 is a side view of the control device of FIGURE 1 before the same is attached to the supporting structure.

The cover member 26 has a pair of opposed depending portions 36 respectively slotted at 37', FIGURE 3, to define inwardly directed tangs 37 adapted to detachably secure the cover member 26 to the housing 22 in a manner hereinafter described.

Two opposed sides of the housing 22 are respectively provided with large recessed areas 38 adapted to receive the depending portions 36 of the cover member 26, the recessed areas 38 having smaller recessed areas 39 formed therein to define shoulders 40.

After the insert 27 has been assembled to the cover member 26 in the above manner so that the enlargement 28 thereof has opposed sides thereof nested between the inwardly directed tab means 34, the assembled insert 27 and cover member 26 are adapted to be secured to the housing 22 by press-fitting the tangs 37 over the housing 22 until the tangs 37 pass beyond the shoulders 40 and snap inwardly into the recessed areas 39 to detachably hold the cover member 26 to the housing 22 in the manner illustrated in FIGURE 1.

Thereafter, the control device 20 is adapted to be secured to the supporting structure 21 by inserting the shank portion 29 of the threaded insert 27 through the opening 32 in the supporting structure 21 and threading the nut 33 thereon to tightly draw the enlargement 28 of the insert 27 against the cover member 26 to stack the cover member 26 against the supporting structure 21 in a manner illustrated in FIGURE 1.

To prevent rotation of the control device 20 relative to the supporting structure 21 while the nut 33 is being tightened in the above manner, the cover member can have a plurality of outwardly directed tab means 41 which are adapted to bite into the supporting structure 21 to prevent rotation of the control device 20 relative thereto during the nut tightening operation.

Therefore, it can be seen that it is a relatively simple operation to attach the bushing 27 and cover member 26 to the housing 22 as well as to attach the assembled control device 20 to the supporting structure 21 without requiring securement of the bushing 27 to the cover member 26 as in the past.

Further, relatively cheap and non-weldable material can be utilized for the bushing 27 and the cover member 26, features heretofore unknown in the control device art.

After the control device 20 has been mounted to the supporting structure 21 in the above manner, the control knob 25 can be secured to the control shaft 24 in a manner conventional in the art.

Should it be found that the threads of the bushing 27 have become damaged or the insert 27 has become damaged in some other manner during use thereof, the bushing 27 can be disassembled from the control device 20 in the above manner whereby another bushing 27 can be utilized in place thereof without requiring a complete new assembly of the cover member 26 and bushing 27 as in the past.

Accordingly, it can be seen that this invention provides improved means and methods for mounting a control device or the like to a supporting structure in a non-time consuming manner.

While the form of the invention now preferred has been disclosed as required by the statutes, other forms may be used, all coming within the scope of the claims which follow.

What is claimed is:

1. In combination, a housing means, a mounting plate means carried by said housing means and having an aperture passing therethrough, and a detachable mounting bushing passing through said aperture and having an enlargement with many like side means disposed between said housing means and said mounting plate and being wider than said aperture in any rotational position of said bushing relative to said mounting means, one of said housing means and said mounting plate means having tab means engaging the side means of said enlargement in any rotational position of said bushing for preventing rotation of said bushing relative to said housing means and mounting plate means in any rotational direction even though said bushing is detachable therefrom.

2. In combination, a housing means, a mounting plate means carried by said housing means and having an aperture passing therethrough, and a threaded bushing passing through said aperture and having an enlargement with many like side means disposed between said housing means and said mounting plate means and being wider than said aperture in any rotational position of said bushing relative to said mounting plate means, one of said housing means and said mounting plate means having tab means engageable by the side means of said enlargement of said bushing in any rotational position of said bushing to prevent rotation of said bushing relative to said means in any rotational direction.

3. In combination, a housing means having an outwardly extending control shaft, a mounting plate means carried by said housing means and having an aperture passing therethrough and telescopically receiving said control shaft, a detachable mounting bushing passing through said aperture and telescopically receiving said control shaft, said bushing having an enlargement with many like side means disposed between said housing means and said mounting plate means and being wider than said aperture in any rotational position of said bushing relative to said mounting plate means, one of said housing means and said mounting plate means having tab means engaging the side means of said enlargement in any rotational position of said bushing for preventing rotation of said bushing relative to said housing means and said mounting plate means in any rotational direction even though said bushing is detachable therefrom, a supporting structure having an opening receiving said bushing whereby said housing means and said mounting plate means are disposed on one side of said supporting structure, and means securing said bushing to said supporting structure.

4. In combination, a housing means having an outwardly extending control shaft, a mounting plate means carried by said housing means and having an aperture passing therethrough and telescopically receiving said control shaft, a threaded bushing passing through said aperture and telescopically receiving said control shaft, said bushing having an enlargement with many like side means disposed between said housing means and said mounting plate means and being wider than said aperture in any rotational position of said bushing relative to said mounting plate means, one of said housing means and said mounting plate means having tab means engageable by the side means of said enlargement of said bushing to prevent rotation of said bushing relative to said means in any rotational direction, a supporting structure having an opening receiving said bushing whereby said housing means and said mounting plate means are disposed on one side of said supporting structure, and a nut threaded on said bushing on the other side of said supporting structure to secure said housing means and said mounting plate means to said supporting structure.

5. A mounting plate for a control device or the like and having an aperture passing therethrough, said mounting plate having tab means extending from one side thereof and disposed outboard of the periphery of said aperture, said tab means being carved from said mounting plate and defining slot means extending outwardly from said aperture and being interconnected thereto.

References Cited by the Examiner
UNITED STATES PATENTS

| | | | |
|---|---|---|---|
| 1,306,100 | 6/1919 | Chadwick | 287—20 |
| 1,591,057 | 7/1926 | Schwartz | 287—20.3 |
| 2,522,172 | 9/1950 | Gates | 287—20 |
| 2,928,065 | 3/1960 | Hennessy | 24—73 |

CARL W. TOMLIN, *Primary Examiner.*